Figure 1:
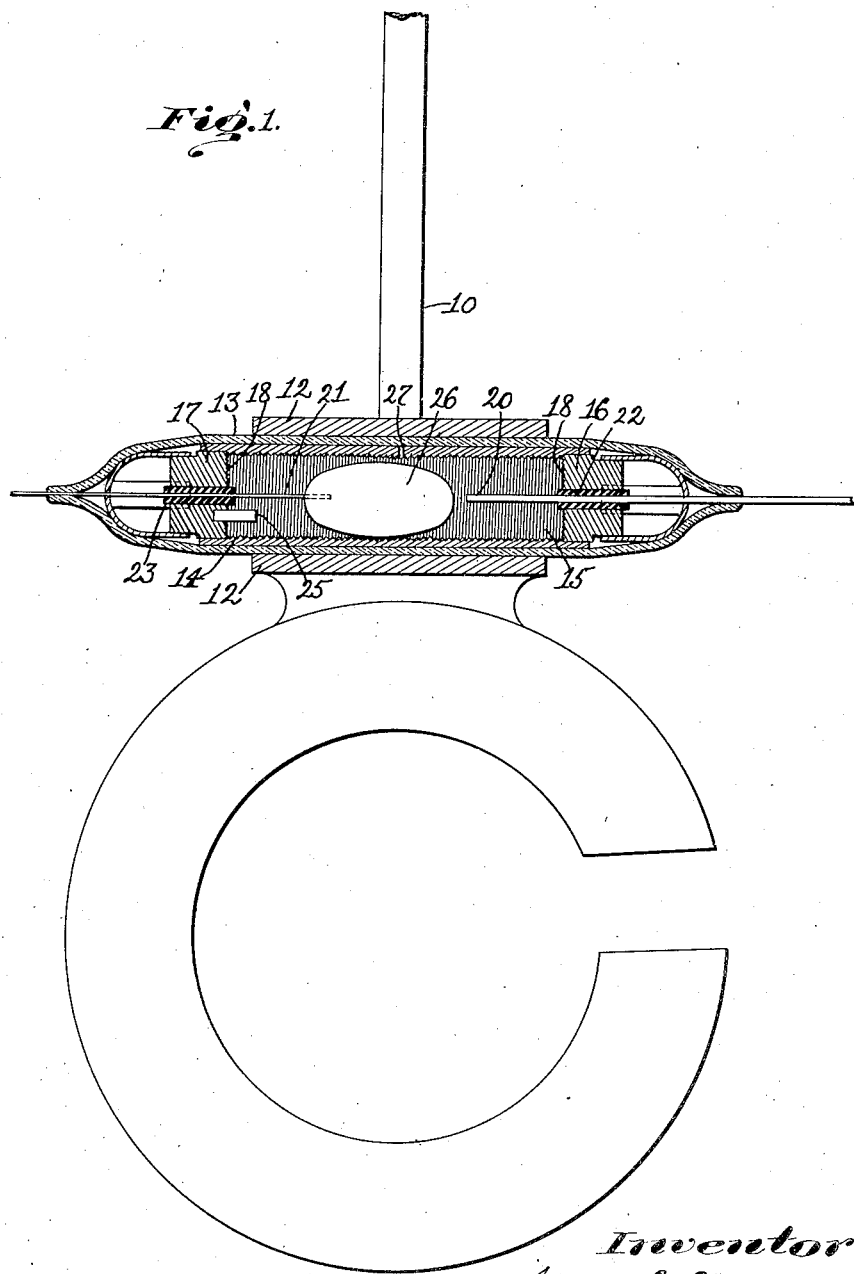

H. E. WARREN.
ELECTRICALLY DRIVEN CLOCK.
APPLICATION FILED MAR. 3, 1916.

1,334,422.

Patented Mar. 23, 1920.
3 SHEETS—SHEET 1.

Inventor:
Henry E. Warren
by Jas. H. Churchill
Atty.

H. E. WARREN.
ELECTRICALLY DRIVEN CLOCK.
APPLICATION FILED MAR. 3, 1916.
1,334,422.
Patented Mar. 23, 1920.
3 SHEETS—SHEET 2.
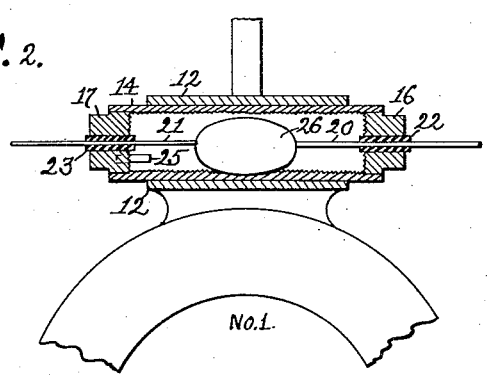
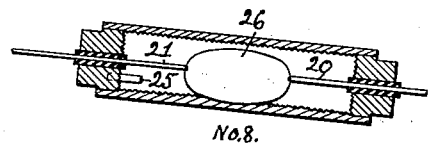
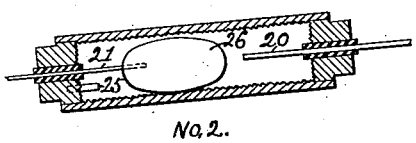
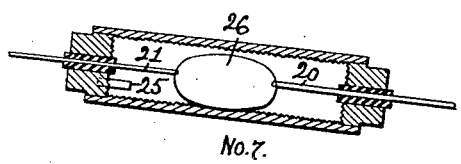
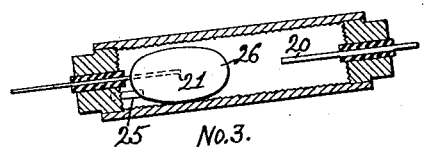
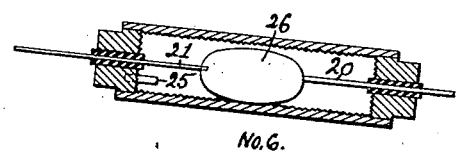
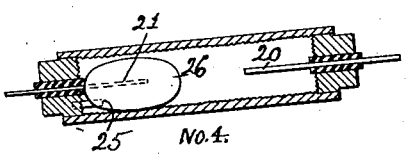
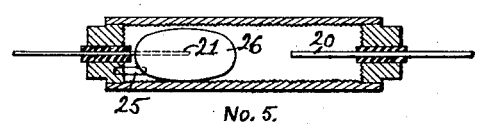
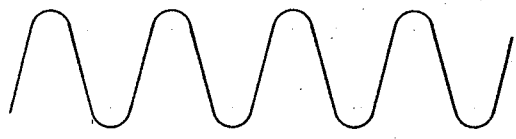
Inventor
Henry E. Warren
by Jas. H. Churchill
Atty.

H. E. WARREN.
ELECTRICALLY DRIVEN CLOCK.
APPLICATION FILED MAR. 3, 1916.
1,334,422.
Patented Mar. 23, 1920.
3 SHEETS—SHEET 3.
Fig. 4.
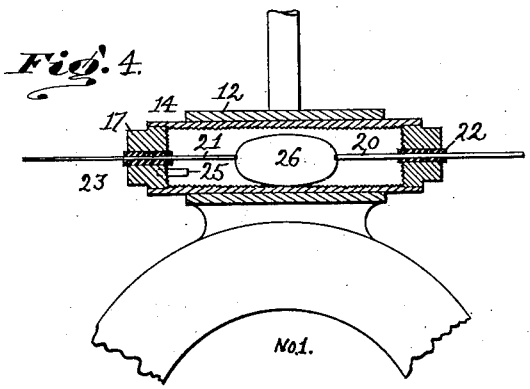
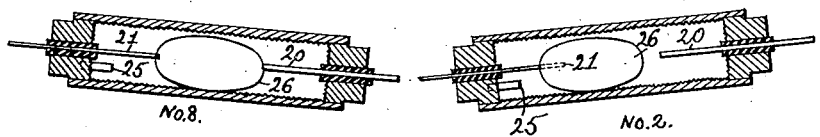
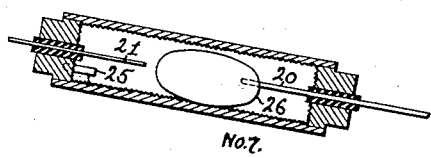 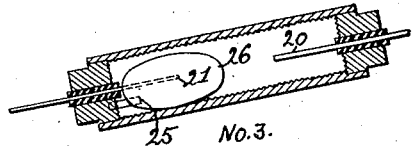
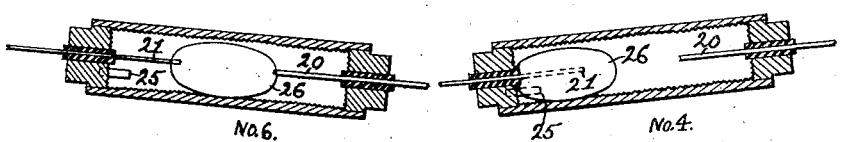
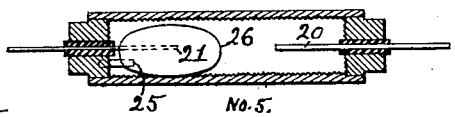
Fig. 5.
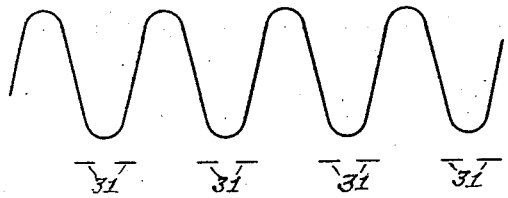
Inventor:
Henry E. Warren
by Jas. H. Churchill
Atty.

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

ELECTRICALLY-DRIVEN CLOCK.

1,334,422.   Specification of Letters Patent.   Patented Mar. 23, 1920.

Application filed March 3, 1916. Serial No. 81,782.

*To all whom it may concern:*

Be it known that I, HENRY E. WARREN, a citizen of the United States, and a resident of Ashland, in the county of Middlesex and State of Massachusetts, have invented an Improvement in Electrically-Driven Clocks, of which the following description, in connection with the accompanying drawings, is a specification, like characters on the drawings representing like parts.

This invention relates to an electrically driven clock and is an improvement upon that shown and described in U. S. Patent No. 1,144,973 granted to me June 29, 1915.

The present invention has for its object to provide clocks of the character described, with means for maintaining the amplitude of swing of the pendulum substantially constant, irrespective of the strength of the battery or other source of current employed to oscillate the pendulum, whereby the accuracy of the clock is practically unaffected by the condition of the battery, and the clock may be run equally well by a new or fresh battery or one which is nearly exhausted.

To this end I employ a circuit controller or contact-making device, which is movable with the pendulum and has provision for governing the duration of closure of the circuit by the amplitude of the pendulum, so that while the pendulum swings in a substantially small arc a relatively long closure of the circuit is obtained, and when the pendulum swings in a materially longer arc, a plurality of relatively shorter closures of the circuit are obtained, with the result, that in the latter case the amplitude of the pendulum is quickly shortened and restored to the length desired.

The contact-making device for effecting the above result, may and preferably will be provided as in the contact-making device of the patent referred to, with a globule of liquid, preferably mercury, which is arranged to move freely on a roughened or non-adhesive pathway, and which coöperates in accordance with the present invention with electrodes, which extend toward each other from opposite ends of said pathway and are separated at their inner ends by a distance slightly less than the length of the mercury globule, so that during each oscillation of the pendulum, the circuit may be closed between the electrodes by the mercury globule which forms the movable member of the circuit controller.

The pathway is provided at its ends with devices forming complete reflecting surfaces, and preferably also with one or more partial or auxiliary reflecting surfaces, one of which latter may be one of the electrodes, as will be described.

The mercury globule is movable in a metal casing, which forms the pathway and may be provided on its inner surface with a substantially fine screw-thread, and the end walls or heads of the casing may be provided with concentric circles to form roughened surfaces. The casing referred to, is preferably substantially freed from air and is inclosed in a sealed vacuum chamber or outside casing, preferably of glass, through the ends of which the electrodes are extended.

These and other features of this invention will be pointed out in the claims at the end of this specification.

Figure 1 represents a sufficient portion of the pendulum of an electrically driven clock provided with a circuit controller or contact-making device embodying this invention.

Fig. 2, a diagrammatic representation illustrating the operation of the circuit controller when the pendulum is swung through a relatively small arc.

Fig. 3 is a curve representing the small amplitudes of the pendulum and the long closures of the circuit.

Fig. 4, a diagrammatic representation illustrating the operation of the circuit controller when the amplitude of the pendulum is relatively large, and Fig. 5, is a curve representing the long amplitudes of the pendulum and the short closures of the circuit.

Referring to Fig. 1, 10 represents the pendulum of an electrically driven clock, which may be substantially such as is shown and described in the patent above referred to.

The pendulum 10 has fastened to it to move therewith a clamping device 12, within which is firmly held a sealed glass vessel 13 containing a steel tube or casing 14, which is roughened on its inside, preferably by cutting therein a fine screw-thread 15.

The casing 14 is provided with removable heads or end walls 16, 17, which are roughened on their inner faces, preferably by concentric circles 18, and said heads are fitted air-tight into said casing. Passing through the heads 16, 17, are electrodes 20, 21, which are insulated therefrom by sleeves 22, 23, of insulating material.

In the present instance the electrode 20 is made of larger diameter than the electrode 21 to impart to the former the function of a partial or auxiliary reflecting surface associated with the head 16, and projecting from the head 17 is a short pin 25, which forms a partial or auxiliary reflecting surface associated with the head 17. The heads 16, 17, serve as main or total reflecting surfaces. The electrode 21 is made preferably very fine so as to enable it to penetrate the surface of the mercury globule 26. The partial reflector 25 may and preferably will be about .050 inch long and about .025 inch in diameter, and the electrode 20 may and preferably will be about .015 inch in diameter.

The tube 14 is provided with a very fine vent opening 27 to permit air to be exhausted from the said tube when the glass casing 13 is exhausted and sealed.

The operation of the apparatus may be briefly described as follows: When the pendulum is swinging through a substantially small arc as represented in Fig. 2, the mercury globule 26, which constitutes the movable member of the circuit controller, will travel or oscillate between the end of the auxiliary reflector 25 and the end of the auxiliary reflector and electrode 20. In so doing the electrodes 20, 21, will be connected by the globule 26 and the circuit completed once during each complete swing of the pendulum while the latter is moving from the position No. 6 in Fig. 2 to position No. 1, and the current impulse so created may be utilized to drive the pendulum by any suitable means, such as described in the patent referred to.

These impulses are timed so as to have a strong driving effect and tend to increase the swing of the pendulum. As the swing increases, the globule 26 in its movement toward the partial reflector 25 will pass beyond the end thereof and strike against the face of the head 17, which is a total reflector.

As the swing of the pendulum increases further, the globule 26 in its movement in the opposite direction, will strike with greater violence against the end of the electrode 20 and eventually the surface of the globule 26 will be penetrated by the electrode 20, as represented in position No. 7, Fig. 4, and partial reflection will take place.

The right hand travel of the globule 26, represented in Fig. 2, by positions Nos. 6, 7, 8 and 1, no longer terminates at electrode 20 as represented in positions Nos. 6, 7 and 8 in Fig. 2, but passing slightly beyond as represented in position No. 7 in Fig. 4, will soon result in a double contact for each swing of the pendulum, one contact taking place when the pendulum reaches position No. 6, Fig. 4, before the pendulum reaches its extreme outward position represented by No. 7, and the other taking place on the beginning of the swing of the pendulum in the opposite direction as represented in position No. 8, Fig. 4. It will thus be seen that on the swing of the pendulum from its extreme right hand position, represented in position No. 3 in Fig. 4, to its extreme left hand position, represented in position No. 7 in Fig. 4, the circuit is completed by the globule 26 contacting with both electrodes 20, 21, as represented in position No. 6, Fig. 4; is broken at the extreme position No. 7 and again completed in position No. 8.

The duration of the period of open circuit between the two closures will depend upon the amplitude of the globule 26 and consequently upon the amplitude of the pendulum. It is a fact that when the amplitude of the globule 26 is sufficient to cause the double closure of the circuit at each complete swing of the pendulum, any further increase in amplitude will very greatly reduce the effectiveness of the driving impulses. The reason for this becomes apparent by a comparison of Figs. 2 and 3 with Figs. 4 and 5.

By reference to Figs. 2 and 3, it will be observed that the duration of contact of the globule 26 with the electrodes 20, 21, is longer and the phase angle with respect to the pendulum more effective in Figs. 2 and 3, where the amplitude is small, than in Figs. 4 and 5, where the amplitude is large and double contacts are occurring. In Fig. 3, the long closures are represented by the lines 30, whereas in Fig. 5, the short closures are represented by the lines 31.

The long closure represented by the lines 30 in Fig. 3, occurs on each complete swing of the pendulum in a short arc, while the latter is passing from position No. 6 through Nos. 7 and 8 to No. 1, whereas the short closures with the break in the circuit between them, represented by the short lines 31 and the space between them in Fig. 5, occur on each complete swing of the pendulum in a materially longer arc, while the pendulum is passing from position No. 6 through No. 7 and to No. 8 in Fig. 4.

In practice it has been found that the proper distance apart of the reflecting surfaces varies somewhat with the period of the swing of the pendulum, with the vertical height of the contact-maker on the pendulum rod, with the size of the globule, and with the character of the reflecting surfaces.

The longer the pendulum in general, the longer may be the free path of travel for the globule. With a pendulum eight inches long, having a contact-maker mounted about five inches below the point of suspension, good results have been obtained with a mercury globule three-eighths of an inch long, which has a free path of five-sixteenths of an inch between the main or principal reflecting surfaces.

The auxiliary or partial reflecting surfaces at the ends of the free path of the globule serve the purpose as above described, of accurately controlling the amplitude or swing of the pendulum, and they are of such nature that they will not penetrate the surface of the globule 26 if the latter has a low velocity, but will penetrate the surface and consequently not reflect the globule abruptly, if the velocity is higher. In practice, it has been found that the proper degree of partial reflection is obtained by the end of a steel wire between .010 and .040 of an inch in diameter under the condition above mentioned, but it is not desired to limit the invention to the particular dimensions herein specified.

I have herein shown one of the partial reflectors as an electrode, but it is not desired to limit the invention in this respect.

Furthermore, it has been found that with the circuit controller or contact-making device above described, the swing of a free pendulum may be maintained at almost exactly the same amplitude, although the strength of the driving current may be varied one thousand per cent. and therefore such a pendulum is practically independent of the strength of the battery employed to run the clock, and the latter may be run equally well by a new battery or one which is nearly exhausted. One construction of apparatus which embodies the invention and may be preferred is herein shown, but it is not desired to limit the invention to the particular construction shown.

From the above description, it will be observed that with the apparatus herein shown, the circuit is closed one or more times on each swing of the pendulum.

Claims:

1. A contact maker adapted to be mounted on the pendulum of an electrically driven clock, comprising a container having a pathway therein, a mass of conducting material freely movable thereover and arranged to close an electric circuit when in a predetermined position thereon, and partially reflecting surfaces disposed along said pathway and proportioned to reflect said mass until the oscillations of said pendulum exceed a predetermined amplitude.

2. An electrically driven pendulum, a contact-maker therefor movable therewith and provided with electrodes spaced apart and an intermediate movable member which makes single contacts with said electrodes for each complete oscillation of the pendulum when the amplitude of swing of the pendulum is small, and double contacts separated by a time-interval for each complete vibration of the pendulum when the amplitude of swing of the pendulum is greater.

3. A contact-maker for an electrically driven pendulum consisting of an internally roughened tube, a mass of mercury contained therein, ends for the tube to prevent the escape of mercury, electrodes projecting toward each other from both ends of the tube but insulated therefrom, separated by a space less than the length of the mass of mercury, both of said electrodes being so small as to penetrate through the surface of the mercury when the pendulum is swinging through a wide amplitude, but one of which electrodes is so large as to fail to penetrate the surface of the mercury when the amplitude of swing of the pendulum is small.

4. A contact-maker for an electrically driven pendulum consisting of a mass of mercury mounted upon a pathway, means to prevent adhesion between the mercury and the pathway, obstacles to limit the path of travel of the mercury on the pathway to a certain extent when the swing of the pendulum is small, but to permit an increasing travel of the mercury when the swing is greater, and electrodes projecting into the path of travel of the mercury which are bridged by the mercury once during each complete oscillation of the pendulum under the former condition, and twice during each complete oscillation of the pendulum under the latter condition.

5. The combination with an electrically driven clock provided with an oscillating pendulum, of a circuit controller movable with said pendulum, means energized by the current from said controller for influencing the amplitude of the pendulum oscillations, and current governing mechanism in said controller responsive to the amplitude of said oscillations for proportioning the strength of the current supplied to said means so as to keep said amplitude substantially constant.

6. A circuit controller of the character described, comprising a casing provided with heads, electrodes supported by said heads and extended toward each other, a contact member movable in said casing and coöperating with said electrodes to electrically connect them, and a substantially short reflecting surface extended from one of said heads and coöperating with said movable contact member.

7. A circuit controller of the character described, comprising a casing provided with heads, electrodes of different diameters supported by said heads and extended toward each other, a contact member movable in said casing and coöperating with said electrodes to electrically connect them, and a substantially short reflecting surface extended from the head carrying the electrode of smaller diameter and coöperating with said movable contact member.

8. A circuit controller of the character described, comprising a casing having heads, electrodes extended from said heads toward each other within said casing, and a contact member movable in said casing and coöperating with said electrodes to electrically connect them and to electrically disconnect said electrodes by movement of the contact member away from and out of contact with one electrode under one condition and away from and out of contact with the other electrode under another condition.

9. A circuit controller of the character described, comprising a casing having heads, electrodes of different thickness extended from said heads toward each other within said casing, and a contact member of a material capable of being penetrated by said electrodes and movable in said casing and coöperating with said electrodes to electrically connect them and to be more readily penetrated by the electrode of less thickness.

10. The combination with an electrically driven clock provided with an oscillating pendulum, of a circuit controller movable with said pendulum and provided with electrodes spaced apart and with a movable member located between said electrodes and coöperating therewith to electrically connect them and bodily movable in opposite directions to electrically disconnect said electrodes by movement of the said movable member away from and out of contact with one electrode under one condition and away from and out of contact with the other electrode under another condition, to give one or more closures of the circuit in which the controller is included by the amplitude of the pendulum.

In testimony whereof, I have signed my name to this specification.

HENRY E. WARREN.